Figure 1:
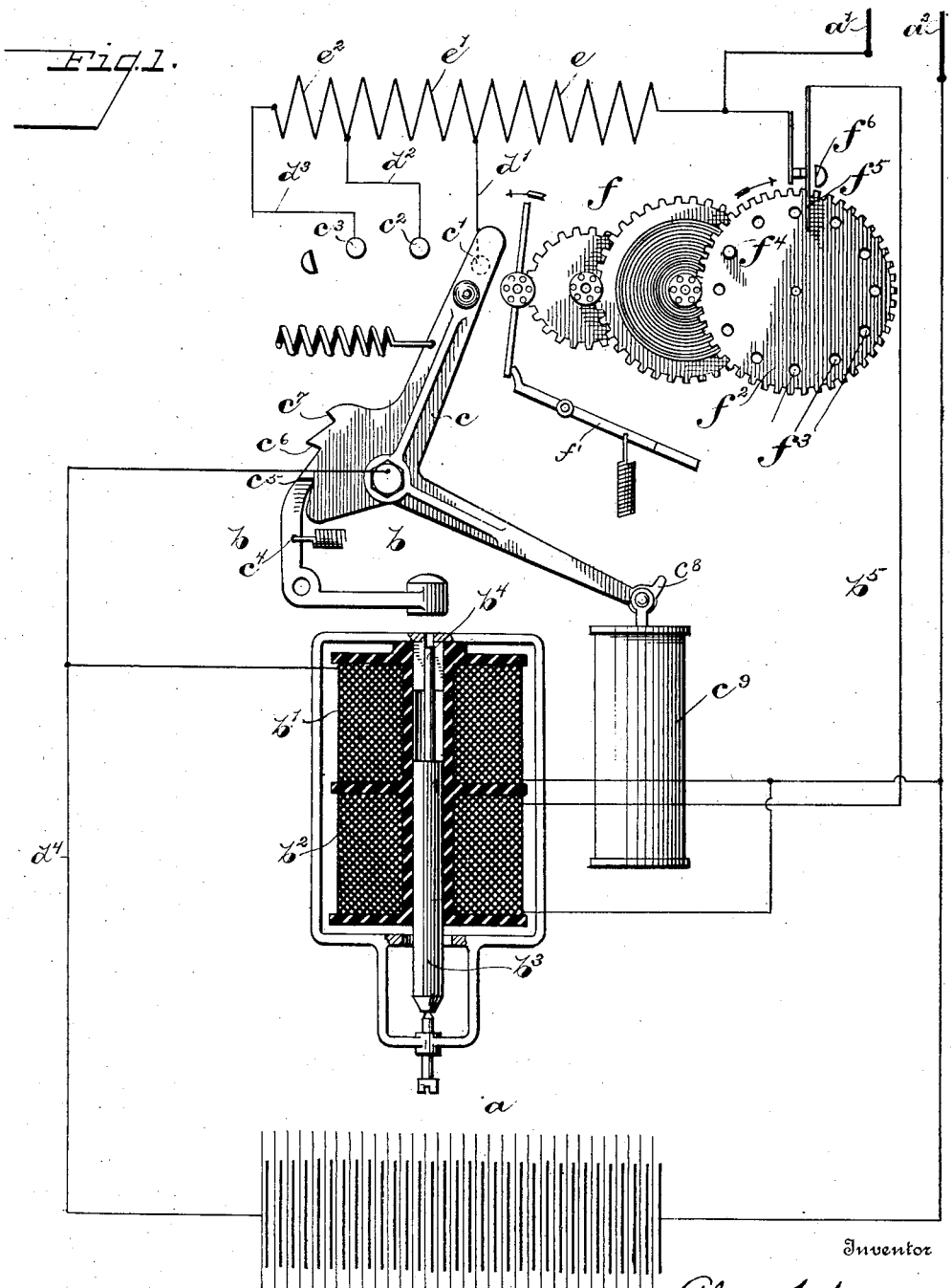

A. S. KROTZ.
APPARATUS FOR CHARGING STORAGE BATTERIES.
APPLICATION FILED JAN. 12, 1905.

969,542.

Patented Sept. 6, 1910.

3 SHEETS—SHEET 1.

A. S. KROTZ.
APPARATUS FOR CHARGING STORAGE BATTERIES.
APPLICATION FILED JAN. 12, 1905.
969,542.
Patented Sept. 6, 1910.
3 SHEETS—SHEET 2.
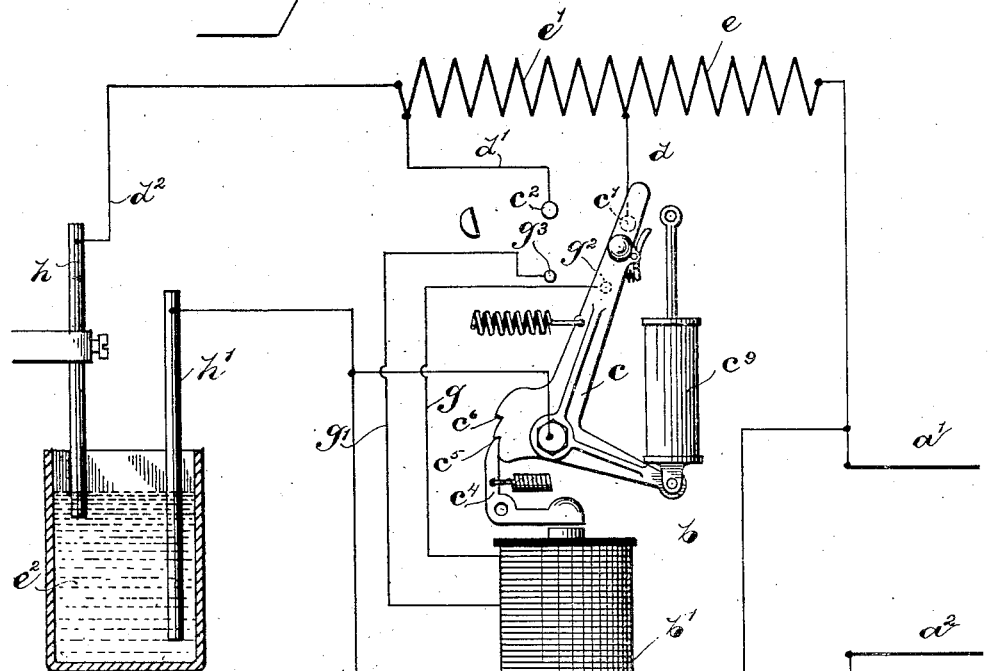
Fig. 2.
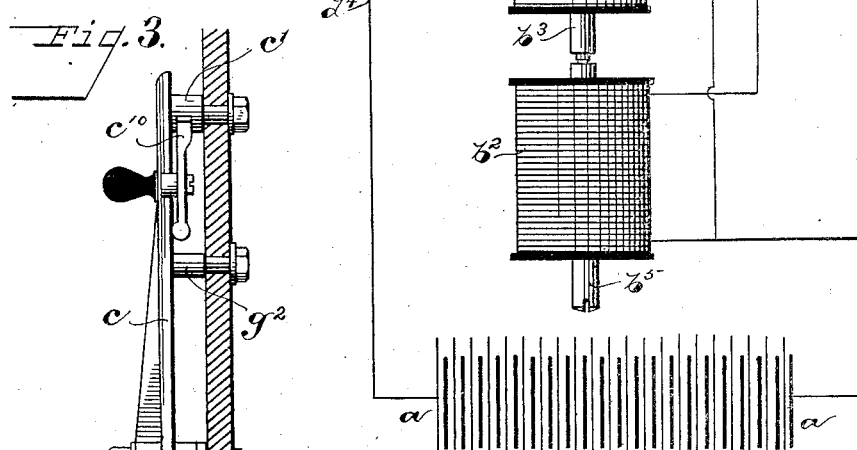
Fig. 3.
Fig. 4.
Witnesses
Inventor
Alvan S. Krotz
By
Attorneys

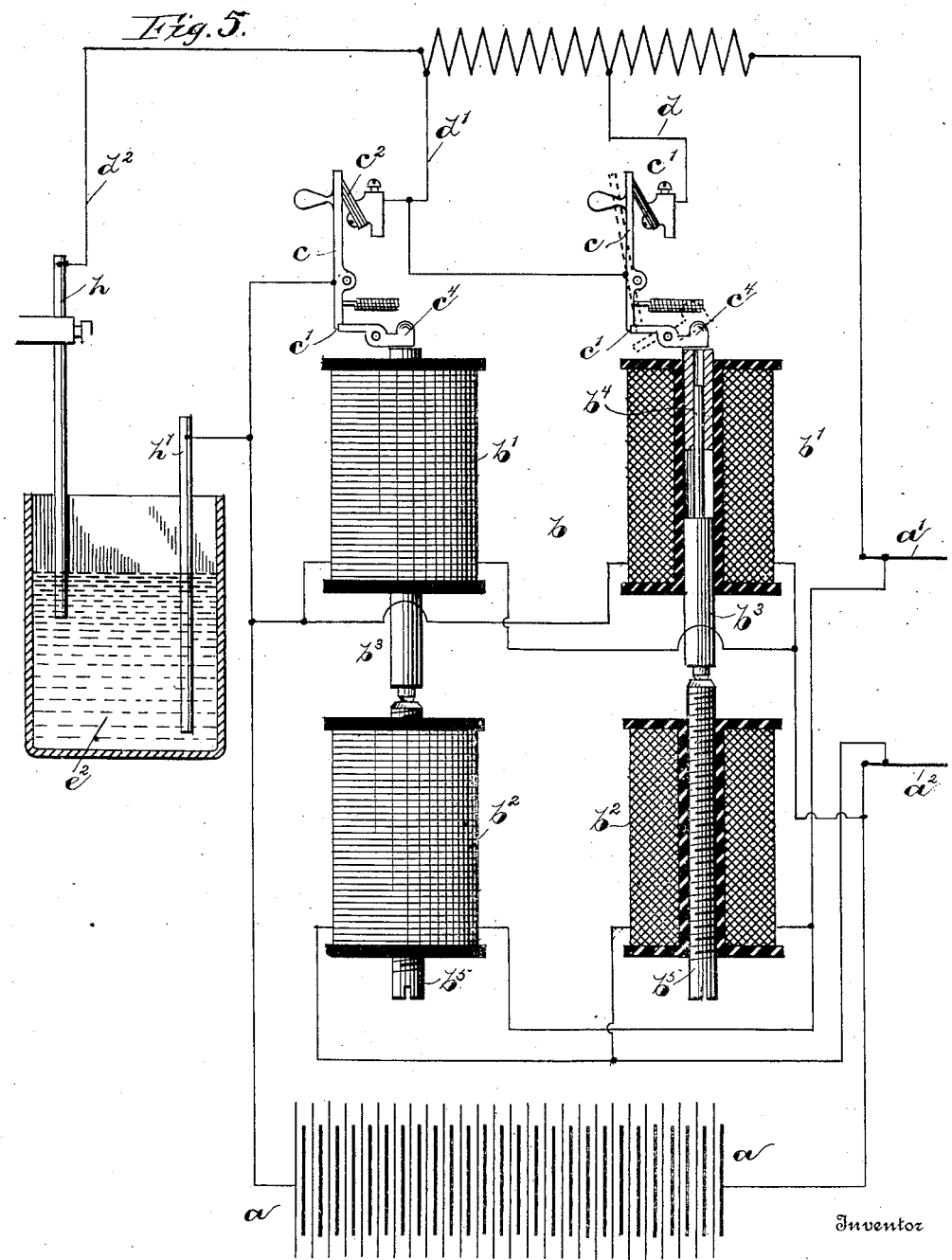

UNITED STATES PATENT OFFICE.

ALVARO S. KROTZ, OF SPRINGFIELD, OHIO, ASSIGNOR OF ONE-HALF TO PAUL A. STALEY, OF SPRINGFIELD, OHIO.

APPARATUS FOR CHARGING STORAGE BATTERIES.

969,542.   Specification of Letters Patent.   Patented Sept. 6, 1910.

Application filed January 12, 1905. Serial No. 240,720.

*To all whom it may concern:*

Be it known that I, ALVARO S. KROTZ, citizen of the United States, residing at Springfield, in the county of Clark and State of Ohio, have invented certain new and useful Improvements in Apparatus for Charging Storage Batteries, of which the following is a specification.

My invention relates to improvements in apparatus for charging storage batteries, particularly that class of batteries which need frequent charging and are used by unskilful operators, such as automobile batteries and batteries used for similar purposes.

The object of my invention is to provide means by which a battery of this character can be properly charged without any attention on the part of the operator other than the proper setting of the apparatus and the operation of a switch for turning on the current, the apparatus being such that the battery will be charged in the most efficient manner and automatically disconnected when properly charged.

It has been found by experience that storage batteries, particularly those used in automobiles, receive more injuries and sustain a greater loss in their efficiency from improper charging than from discharging. In order that a battery of this character shall have the highest efficiency it is desirable that it receive an initial charge at a comparatively high rate until it has attained a sufficient voltage, after which the rate of charge shall be reduced until fully charged. It is desirable also that at certain periods the battery should receive an overcharge at a low rate for a definite length of time, depending upon the use and condition of the battery.

I accomplish all these objects by the methods and apparatus herein described in such a way that the results will be attained with certainty without the requisite of any technical knowledge or skill on the part of the operator.

The invention consists in the apparatus hereinafter described and set forth in the claims.

In the accompanying drawings, Figure 1 is a diagrammatic view illustrating a method and apparatus embodying my invention. Fig. 2 is a similar view showing a modification. Figs. 3 and 4 are detail views of the apparatus shown in Fig. 2. Fig. 5 is a diagrammatic view showing a further modification.

Like parts are represented in the several views by similar characters of reference.

In carrying out my invention I employ an automatic cut-out device of novel construction in connection with circuits and other apparatus by means of which the method of charging to secure the best results are carried out. Various forms of this cut-out device may be employed, but in order to carry out the method of charging in its most successful application to the work to be performed this cut-out device is employed with two opposing magnets, one of which is located in a shunt of the battery to be charged and the other connected to a source of electric supply of constant potential, such, for instance, as the main line.

In the accompanying drawings, $a$ $a$ represent the storage battery to be charged.

$a^1$ and $a^2$ represent the main lines from which the current is to be supplied. To secure the best results in carrying out this method the main charging circuit is provided with three branches, each of which contains a circuit breaking device and each so arranged as to have a different amperage. The first of these circuits or branches has the largest amperage, the second a less, and the third preferably a slightly reduced amperage. Each of the lines may be provided with variable resistances to vary their amperage, though as a rule these resistances may be fixed when the same batteries or batteries having like potentials and capacities are to be charged. The first and second of these circuits or branches are so constructed that the circuit breakers therein will be controlled by the potentials of the battery and the third by a timing apparatus which shall be independent of the potential of the battery.

Referring to Fig. 1, it will be seen that each of the three circuits or branches named are adapted to be controlled by a single automatic circuit breaking device, $b$. A circuit breaking arm, $c$, preferably spring actuated, is adapted to break the circuit under certain conditions from the respective terminals, $c^1$, $c^2$ and $c^3$, in the several charging circuits or branches. The circuit breaking arm, $c$, is connected directly to one pole of the battery, the other pole being connected to the main line as shown. If more than one circuit breaker is used they will be connected in series to one pole of the battery. The other pole of the main line is connected to the respective circuits, $d^1$, $d^2$ and $d^3$, each of said circuits being preferably provided with resistance, $e, e^1$ and $e^2$, to give to the said circuits the desired amperage. The arm, $c$, of the circuit breaker, $b$, is held in position by a catch, $c^4$, which is adapted to be disengaged by a movable core, $b^3$, passing through the magnets, $b^1$ $b^2$. These magnets, $b^1$ $b^2$, are connected respectively to a shunt of the battery, $a$ $a$, and to a source of constant potential or the main line. These magnets may be wound together at opposite ends of the core, or they may be employed separately and the core made in two parts. In either event the movable core is capable of adjustment so that the opposing pull of the magnets can be properly disposed on the core to cause it to move at the proper time. This may be accomplished by screwthreading the part which normally supports the movable core, as shown in Fig. 5. The magnet, $b^2$, being connected to the main line, or some other source of constant potential, has a constant pull, except as influenced by temperature, as hereinafter described, while the magnet, $b^1$, being in the battery shunt, has a varying pull depending upon the potential of the battery.

Referring now to Fig. 1, I have shown the circuit breaking device, $b$, with the magnets or coils, $b^1$ and $b^2$, arranged one above the other; the movable core, $b^3$, therein being adapted to move vertically and to drop by gravity when uninfluenced by the magnetic pull of the coils, $b^1$ and $b^2$; the core having an extension, $b^4$, adapted when drawn upwardly to contact with the end of the catch, $c^4$. The arm, $c$, is provided with three notches, $c^5$, $c^6$ and $c^7$, each adapted to be engaged by the catch, $c^4$, and when so engaged to hold said arm in contact with one of the terminals, $c^1$, $c^2$, $c^3$, of the branch circuits, $d^1$, $d^2$, $d^3$; this circuit breaking arm, $c$, being connected to the battery through a line, $d^4$.

In this simple form of the apparatus advantage is taken of the fact that in ordinary storage batteries the potential of the battery in charging is correspondingly higher under a higher rate of charge than in a low rate of charge. Hence, in starting the charge the arm, $c$, is placed in contact with the terminal, $c^1$, which will give the highest rate of charge. When the battery has at this rate of charge reached a certain given potential or voltage the increased pull on the magnet $b^1$, resulting from this voltage will cause the core to be drawn upwardly, contact with the catch, $c^4$, withdraw it from the notch, $c^5$, of the arm, $c$, and permit said arm to be drawn out of contact with the terminal $d^1$. This breaks the charging circuit. The voltage on the line, $d^4$, will be reduced and the magnetic pull of the coil, $b^1$, reduced, while the coil, $b^2$, will be constant and will cause the core to be drawn down and allow the catch to engage in the second notch, $c^6$, with the circuit breaking arm, $c$, in contact with the second terminal, $c^2$, of the branch, $d^2$, thus securing a still lower rate of charge and a correspondingly lower battery voltage. This rate of charge will generally be arranged so that, the battery being in normal condition, the proper voltage to again operate the core will be that of the battery when it is fully charged. This will again cause the core, $b^3$, to be operated and allow the arm to move to the next terminal, $c^3$, or the lowest rate of charge. This low rate of charge will not ordinarily, under the normal conditions of the battery, affect the voltage or potential thereof, but will be in the nature of an over charge, and inasmuch as the voltage will not be increased thereby, means are provided by which, after a certain definite length of time during which it is desired to over charge the battery, the third and last charging circuit will be disconnected. In Fig. 1 I have shown this accomplished through the aid of a timing device which is adapted, after a certain length of time, to break the circuit from the main line through the constant magnetic coil, $b^2$. This may be done in various ways, but I have shown a simple clockwork, $f$, having a detent, $f^1$, adapted to be engaged by an extended portion, $c^8$, of the arm, $c$, while the arm, $c$, is passing from the terminal, $c^2$, of the terminal, $c^3$. The catch, $c^4$, will engage in the notch, $c^7$, of the arm and hold it on the terminal $c^3$. At the same time the clockwork, $f$, having been set in motion, will, after a certain definite time, break the circuit to the coil, $b^2$, and thus relieving the magnetic pull of this magnet, will produce another movement of the core, $b^3$, which will finally disconnect the arm, $c$, and entirely disconnect the charging circuit. To provide for varying the length of time during which this third or over charge will take place, I preferably provide a part of the motor or clockwork, $f$, with a variable contacting device. This may be in the nature of a wheel, $f^2$, having a series of openings, $f^3$, in which may be inserted a contacting pin, $f^4$, adapted to contact with a circuit breaker, $f^5$, in the line, $b^5$, which leads to the coil, $b^2$. The different holes, $f^3$, in this wheel may represent any fraction of time, the clockwork being suitably speeded in a well known manner for this purpose. The timing device being set in motion just prior to the time that the contact is made for the last charging circuit, this last or over charge will continue for a length of time depending upon the position of the contacting part $f^4$. A stop, $f^6$, is preferably employed for the circuit breaking arm, $f^5$, so that when the circuit is broken the timing device will be arrested, it being held by the contacting pin, $f^4$, against the arm, $f^5$, which in turn is brought against the stationary stop, $f^6$. In order to prevent the arm, $c$, from moving past either of the said terminals it may be provided with a dash pot, $c^9$, or other suitable means to prevent a too rapid movement thereof.

In Fig. 2 I have shown a slight modification. The coils, $b^1$ and $b^2$, are shown separate and the core, $b^3$, is made in two parts, the lower part, $b^5$, being normally stationary but screwthreaded as shown in Fig. 5, so as to be adjustable to secure the proper movement of the upper part, $b^3$. The magnetic pull of the constant coil, $b^2$, will operate on the movable core, $b^3$, through the core, $b^5$. I have also shown in this figure the upper coil, $b^1$, provided with two terminals which connect to the battery through the means of circuits, $g$ and $g^1$; one of these terminals being connected to the core winding so that less magnetic influence will be produced than through the other. Contacting points, $g^2$ $g^3$, are provided to contact with the arm, $c$, so that the second movement of the arm, $c$, may be secured at a higher or lower voltage as desired, by reason of the greater or less magnetic influence produced in the coil, $b^1$, through the different circuits, $g$ and $g^1$. These contacting points, $g^2$ and $g^3$, in connection with the arm, $c$, form a circuit breaker for the magnet, $b^1$, which, as the arm $c$ moves, will completely cut out said magnet temporarily and thus rob it of its magnetic influence and cause the core to be moved quickly to its normal position and permitting the catch, $c^4$, to return to its working position during the movement of the arm, $c$, from one contacting point to another. I have also shown a modification in the third or overcharge circuit. In this case the mechanical timing device is dispensed with and after the second movement of the arm, $c$, the current is directed through terminals, $h$ $h^1$, in a vessel containing a conducting liquid such as water, which will be evaporated by the heat produced in the passage of the current through the same. One of the terminals, $h$, will be immersed in the water a sufficient distance so that after a certain amount of evaporation has taken place the liquid will pass below the end of said terminal, thus automatically breaking the circuit.

I have shown in Figs. 3 and 4 detail views of the circuit breaking arm, $c$, the arm being provided with a snap switch, $c^{10}$, adapted, as the arm leaves the terminal, to break the circuit. In setting the device, that is, moving the arm from left to right, the snap switch will be held out of contact by the operator, preferably by placing his thumb on the end of the switch over the spring.

In Fig. 5 a still further modification is shown where I have shown two separate circuit breakers having separate arms, each capable of a single movement. This arrangement may be employed when the first charging rate is to be continued to a voltage less than the normal voltage of the battery when full. For instance, assume that the first charge should be at the rate of 30 amperes until the battery reached a voltage of 60 or 62, when the second charge at the rate of 15 amperes continues until the battery reaches a voltage of 64.

As is well known under favorable conditions the circuit breaking devices will operate with a single coil placed in the shunt of the battery, the potential of the battery alone being adapted to operate the core, $b^3$, to disconnect the circuit breaking arm. Inasmuch, however, as the resistance of the coil is affected by the temperature, it has been found by experience that such a device is unsatisfactory where used in varying temperature, the circuit breaker operating sooner or at a lower voltage when the coil is cold than when it is warm. By using two coils of substantially the same resistance the variation in resistance caused by heating will be compensated for and one balance the other.

By the operation herein described and the apparatus set forth I am enabled to charge a battery under the most advantageous circumstances and in a manner by which injury is impossible and its highest efficiency maintained. It is only necessary for the operator to properly set the device and start the current by any suitable controlling switch (not here shown), the remainder of the method and apparatus being wholly automatic in its nature.

By employing two coils in the circuit breaking device, one a counteracting coil connected so as to have a fixed potential, both coils will increase or decrease the magnetic influence alike in proportion to the temperature of the coils or other changes which will act upon both coils alike, and the effective force which starts the operation of the device is a differential one determined by the differences in the voltage as the battery is more or less completely charged. These opposing coils being otherwise subjected to the same influences in substantially the same way, the device will be operated whenever the battery voltage reaches a certain voltage regardless of the temperature of the coils or other influences which affect both coils alike. It will be understood, of course, that as soon as the core starts to move it moves out of the magnetic influence of the constant coil and rapidly into that of the variable coil, so that as soon as the pull of the constant coil has been overcome the movement will be a rapid one to produce the operation of the circuit breakers.

As arranged in Fig. 1, the point at which the cutout device will operate to change the charging rate may be fixed; that is, the voltage required to operate the device from a higher to a lower rate of charge will be the same as that for the succeeding operations, a predetermined voltage in this case being adapted to successively operate the device for each rate of charge, this being accomplished, as before set forth, by the fact that until the battery has reached its normal capacity each different charging rate will produce a different voltage in the battery and consequently on the coil in the battery shunt. For example, if the normal voltage of the battery would be 64 and the high rate of charging would be 40 amperes, this voltage of 64 would be reached when the battery was perhaps three-fourths full. This would operate the cut-out device to change the rate to say 15 amperes, which would cause the voltage on the battery to drop down to say 60. It would continue at this rate until 64 was again reached, when it would be operated again. At this low rate of charge the battery ought to receive its full charge by the time the voltage has again reached 64, when the device will again be operated and completely cut off the circuit except for the overcharging device. It is obvious that any reasonable number of steps may be used by this means depending on the rates desired for charging. For instance, if the highest rate were say 50 amperes, a second rate of 30 amperes and a third or final rate of 15 amperes might be obtained, using the same voltage to successively operate the cut-out device; these different changes in the charging rate being sufficient to cause a variation of the voltage in the battery shunt to successively operate the device as described.

When two separate devices are used as shown in Fig. 5, in case the first one should fail to operate, the operation of the second one will break the charging circuit and cause the current to pass through the overcharging device.

In Fig. 1 I have shown the variable coil connected permanently in the battery circuit. It is obvious that this connection can be made the same as shown in Fig. 2 so as to be open while the arm $c$ is passing between contacts; thus cutting out the coil, $b^1$, causing the core to more quickly operate, and insuring the operation of the coil.

It is obvious that the rise in the potential of the battery in charging will slightly vary the amount of the charging current which ever rate is being used, hence it is not intended to imply that the charging rate is exactly constant at the different rates given, yet this variation by reason of the rise in the potential of the battery is small in comparison with the change which I make from the high to the low by using the different circuits having different resistance.

Having thus described my invention, I claim:—

1. In combination with a source of electric supply and a battery to be charged, a connection between said battery and said source of electric supply adapted to normally charge said battery at a maximum rate, and means controlled by the potential of said battery to vary the electrical connection to produce a lower rate of charge when a predetermined voltage in the battery has been reached, substantially as specified.

2. In an apparatus for charging storage batteries, means controlled by the accumulated voltage of the battery in charging to successively reduce the charging rate and to automatically bring into operation a timing device to give the battery a definite overcharge when it has reached its normal charged potential, substantially as specified.

3. In an apparatus for charging storage batteries, means controlled by the variation of the potential of the battery in charging to successively change the rate of charging and to automatically discontinue the charging when the battery has reached its normal charged potential, substantially as specified.

4. In a charging apparatus an automatic circuit breaker having two opposing magnets and a movable core, said magnets being arranged successively and longitudinally along said movable core in the direction of its travel, one of said magnets being arranged in a circuit of constant potential and the other magnet being in a circuit of varying potential, means for adjusting the normal position of said core so as to vary the operative differential pull of said magnets.

5. In an automatic circuit breaker for a charging apparatus, opposing magnets operating on a movable core, said magnets being arranged successively and longitudinally along said core in the direction of its travel, one of said magnets being located in a shunt of the charging circuit and the other in a circuit having a constant potential, substantially as specified.

6. In a circuit breaker for an apparatus, two opposing magnets operating upon a movable core, one of said magnets being in a shunt of the device being charged and the other in a circuit of constant potential, and means for varying the differential magnetic pull of the magnets of said core, substantially as specified.

7. In a circuit breaker for charging apparatus, a magnet arranged in a shunt of the device being charged, a circuit breaker arm having a series of steps and a series of contacting devices representing charging circuits of different amperage, a catch for said arm, and a movable core in said magnet adapted, when operated, to contact said catch to release said arm whereby the circuit breaker is adapted to be successively operated, substantially as specified.

8. In a charging apparatus a plurality of circuit breaking devices, and means to operate the same to change the charging rate from a higher to lower amperage by variation of the voltage in the device being charged, a timing device and means for setting the same into operation when the device being charged has reached its normal potential, substantially as specified.

9. In a charging apparatus, an automatic circuit breaker having two opposing magnets, one in the shunt of the device being charged and the other in the main line, a circuit breaking arm adapted to be operated by the differential magnetic pull of said magnets, a timing device adapted to be set in operation by said arm, and a circuit breaker for the main line magnet operated by the timing device, substantially as specified.

10. In a charging apparatus a circuit breaking device adapted, when operated, to change the charging rate from a higher to lower amperage, a magnetic coil having a movable core, said core being adapted under the influence of said magnet to release said circuit breaking device and cause it to be moved to a different position, and means for temporarily breaking the circuit to said magnet while said circuit breaking device is moving from one connection to another.

11. In a charging apparatus a circuit breaking device adapted when operated to change the charging rate from a higher to lower amperage, an electro magnet having a movable core adapted when operated to release said circuit breaking device and means connected with said circuit breaking device to break the circuit to said magnet while said circuit breaking device is moving from one connection to another, and a timing device also adapted to be set in operation by the final movement of said circuit breaking device to give an additional electric charge for a predetermined length of time as specified.

12. In combination with a source of electric supply and a battery to be charged, connection between said battery and said source of electric supply adapted to normally charge said battery at a maximum rate, and means controlled by the potential of said battery to vary the electrical connection to produce a lower rate of charge, substantially as specified.

13. In an apparatus for charging storage batteries, an electrical connection adapted to charge said battery at a high rate, and means controlled by the potential of the battery for changing said connection to produce a lower rate of charge and to automatically break said connection when the battery reaches its full potential.

14. In an apparatus for charging storage batteries, and in connection with a source of electric supply, an electrical connection adapted to carry an initial charge at a high rate, and means controlled by the potential of the battery while charging to change said connection to secure a charge at a lower rate, a timing device, and means controlled by the normal potential of said battery to cause said timing device to be set into operation to give the battery a definite overcharge, substantially as set forth.

In testimony whereof, I have hereunto set my hand this 4th day of January A. D. 1905.

ALVARO S. KROTZ.

Witnesses:
  Chas. I. Welch,
  F. Llewellyn Walker.